United States Patent
Arai et al.

(10) Patent No.: US 7,611,643 B2
(45) Date of Patent: Nov. 3, 2009

(54) ELECTRICALLY CONDUCTING RESIN COMPOSITION FOR FUEL CELL SEPARATOR AND FUEL CELL SEPARATOR

(75) Inventors: Toshihiro Arai, Kawasaki (JP); Hiroshi Sakamoto, Kawasaki (JP); Tomoaki Kobayashi, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 11/136,438

(22) Filed: May 25, 2005

(65) Prior Publication Data

US 2006/0027790 A1    Feb. 9, 2006

Related U.S. Application Data

(60) Provisional application No. 60/577,189, filed on Jun. 7, 2004.

(30) Foreign Application Priority Data

May 27, 2004   (JP) .............................. 2004-157693

(51) Int. Cl.
   *H01B 1/24*   (2006.01)
   *H01M 8/02*   (2006.01)
(52) U.S. Cl. .................. 252/500; 252/511; 429/34
(58) Field of Classification Search .............. 252/500, 252/511; 429/34
   See application file for complete search history.

(56) References Cited

U.S. PATENT DOCUMENTS 4,702,860 A * 10/1987 Kinderov et al. ............ 252/511
5,068,061 A * 11/1991 Knobel et al. ............... 252/511
2003/0027030 A1   2/2003 Kawashima et al.
2004/0146768 A1 *  7/2004 Nishihata et al. ............ 429/34
2007/0178349 A1 *  8/2007 Iino et al. ...................... 429/34

FOREIGN PATENT DOCUMENTS

| | | | |
|---|---|---|---|
| EP | 0 337 487 | * | 10/1989 |
| EP | 0 337 487 A1 | | 10/1989 |
| JP | 1-263156 A | | 10/1989 |
| JP | 8-222241 A | | 8/1996 |
| JP | 2000-348739 A | | 12/2000 |
| JP | 2001-126744 A | | 5/2001 |
| JP | 2002-100377 A | | 4/2002 |
| JP | 2002-105329 A | | 4/2002 |
| JP | 2003-109622 A | | 4/2003 |
| JP | 2003-183461 | * | 7/2003 |
| JP | 2003-183461 A | | 7/2003 |
| JP | 2003-242994 A | | 8/2003 |
| JP | 2003-257446 A | | 9/2003 |
| JP | 2003-268249 | * | 9/2003 |
| JP | 2003-268249 A | | 9/2003 |
| JP | 2004-146258 | | 5/2004 |
| JP | 2004-146258 A | | 5/2004 |
| JP | 2005-200620 A | | 7/2005 |
| WO | WO 02/093670 A1 | | 11/2002 |

* cited by examiner

*Primary Examiner*—Robert D. Harlan
(74) *Attorney, Agent, or Firm*—Sughrue Mion, PLLC (57) ABSTRACT

The present invention are to provide an electrically conducting resin composition for a fuel cell separator which overcomes the drawbacks of prior arts, and to provide a fuel cell separator produced by molding this electrically conducting resin composition and having both of high electrical conductivity and flexural property. The present invention employs an electrically conducting resin composition for a fuel cell including a component A of polypropylene resin whose melt flow rate is 0.01 or higher and 10 or lower and a component B of electrically conducting filler as well as a fuel cell separator made of the same.

29 Claims, 1 Drawing Sheet

FIG.1

ELECTRICALLY CONDUCTING RESIN COMPOSITION FOR FUEL CELL SEPARATOR AND FUEL CELL SEPARATOR

CROSS REFERENCE TO RELATED APPLICATIONS

The present application claims the benefit of U.S. Provisional Application No. 60/577,189 filed on Jun. 7, 2004.

BACKGROUND OF THE INVENTION

1. Field of the Invention

The present invention relates to an electrically conducting resin composition for a fuel cell separator and a fuel cell separator. In more detail, the present invention relates to an electrically conducting resin composition for a fuel cell separator including polypropylene resin whose melt flow rate (MFR) is 0.01 or higher and 10 or lower and electrically conducting filler and having both of high electrical conductivity and flexural property, and to a fuel cell separator made of the same.

The present application claims priority on Japanese Patent Application No. 2004-157693 filed on May 27, 2004, the entire contents of which are incorporated herein by reference. The present application also claims the benefit of U.S. Provisional Application No. 60/577,189 filed on Jun. 7, 2004.

2. Description of Related Art

There have conventionally been used mainly metallic materials and/or carbon materials, etc., for applications that require high electrical conductivity. However, electrically conducting resin compositions are likely to play a much larger role as one kind of electrically conducting material due to the recent diversified applications of electrically conducting materials in various fields such as electronics, electrochemistry, energy, and transport machinery. Accordingly, electrically conducting resin compositions have achieved a remarkable breakthrough in terms of performance and functionality. As an important factor in this breakthrough a substantial improvement in molding processability due to composition of polymer materials can be mentioned. As applications that require electrical conductivity other than conventional ones are recently cited, for example, electronic materials such as circuit boards, resistors, laminates, and electrodes, heaters, pyrogen unit members, filter elements for dust collection, PTC elements, electronics parts, and semiconductor parts can be mentioned. In these applications, not only electrical conductivity but also high heat resistance is required.

Meanwhile, fuel cells have received widespread attention recently from the aspects of environmental issues and energy issues, etc.

Fuel cells are clean generators that utilize hydrogen and oxygen to generate electricity through a reverse electrolytic process with no emissions other than water. Also in the field of fuel cells, electrically conducting resin compositions can play an important role. Among several kinds of fuel cells according to type of electrolytes, proton-exchange membrane fuel cells are most promising for automotive and consumer use due to their low-temperature operability. Such fuel cells can achieve high-power generation by stacking single cells composed of, for example, a polymer solid electrolyte, gas diffusion electrode, catalyst, and separator.

In a separator for separation within a single cell of thus arranged fuel cells is generally formed a flow path (groove) for supplying fuel gas (e.g. hydrogen) and oxidizing gas (e.g. oxygen) and for discharging generated moisture (water vapor) therethrough. Such a separator is therefore required to have high gas impermeability for complete separation of these gases and high electrical conductivity for reduced internal resistance. Such a separator is further required to have high heat conductivity, durability and strength.

In order to achieve the requirements above, there has conventionally been considered the possibility of using metallic materials or carbon materials for such a separator for a fuel cell. In respect to metallic materials of these materials, although it has been attempted to coat the surface thereof with precious metal or carbon in consideration of their poor corrosion resistances, there is a problem of insufficient durability and increased cost in coating.

Meanwhile, there have also been significant consideration given to carbon materials, and as a separator material for a fuel cell that can be mentioned, for example, a molded product obtained by press molding an exfoliated graphite sheet, a molded product hardened by impregnating a carbon sintered body with resin, and glassy carbon obtained by baking thermosetting resin, a molded product obtained by molding the mixture of carbon powder and resin can be mentioned.

For example, Patent Document 1 discloses electrically conducting plastic in which filler having electrical conductivity is unevenly distributed in a polymer with a high affinity for the filler.

Also, Patent Document 2 discloses a complex process comprising the steps of: adding bonding material to carbonaceous powder to perform heat mixing treatment and then CIP (Cold Isostatic Pressing) molding; baking and graphitizing the powder; impregnating and hardening the obtained isotropic graphite material with thermosetting resin; and cutting a gas flow groove by a cutting operation.

It has also been attempted to improve the performance of separators by changing the composition thereof. For example, Patent Document 3 discloses a separator having superior mechanical and electrical characteristics obtained by a composition of carbonaceous powder coated with resin and resin with higher heat resistance than that of the coating resin. Patent Document 4 discloses a resin composition made of a mixture of low-melting metal, metal powder, thermoplastic resin, and thermoplastic elastomer. Also, Patent Document 5 discloses a fuel cell separator obtained by molding a mixed composition of thermoplastic resin and graphite particles. Also, Patent Document 6 discloses a fuel separator including coarse-grained powder of graphite compound of mesocarbon microsphere and thermoplastic resin. Also, Patent Document 7 discloses a fuel separator composed of graphite particle and non-carbonaceous thermoplastic resin.

Patent Document 1: Japanese Unexamined Patent Application, First Publication No. Hei 1-263156

Patent Document 2: Japanese Unexamined Patent Application, First Publication No. Hei 8-222241

Patent Document 3: Japanese Unexamined Patent Application, First Publication No. 2003-257446

Patent Document 4: Japanese Unexamined Patent Application, First Publication No. 2000-348739

Patent Document 5: Japanese Unexamined Patent Application, First Publication No. 2003-109622

Patent Document 6: Japanese Unexamined Patent Application, First Publication No. 2002-100377

Patent Document 7: Japanese Unexamined Patent Application, First Publication No. 2001-126744

SUMMARY OF THE INVENTION

Although various electrically conducting structures made of the respective conventional electrically conducting resin compositions disclosed in the foregoing patent Documents need to substantially increase the filling amount of electrically conducting filler such as carbonaceous materials in order to develop high electrical conductivity, this has resulted in the brittleness. Thus, it is quite difficult to obtain sufficient mechanical characteristics required for a fuel cell separator such as flexural strength and flexural strain.

Objects of the present invention are to provide an electrically conducting resin composition for a fuel cell separator which overcomes the aforementioned drawbacks of the conventional electrically conducting resin compositions, and to provide a fuel cell separator produced by molding this electrically conducting resin composition and having both of high electrical conductivity and flexural property.

An electrically conducting resin composition of the present invention includes polypropylene resin (component A) whose melt flow rate (hereinafter referred to as MFR) is 0.01 or higher and 10 or lower and electrically conducting filler (component B). In the case of the electrically conducting resin composition having high electrical conductivity of 1 Ω·cm or lower in volume resistivity, the flowability is remarkably low and molding process is difficult since a large amount of an electrically conducting filler is filled in the resin, so it is general to select a resin with low molecular weight showing high flowability as a binder resin in order not to deteriorate flowability as possible. However, the mechanical property is generally poor in the electrically conducting resin composition containing the resin with low molecular weight. Nonetheless, the present inventors have found the following and completed the present invention. Even though a large amount of electrically conducting filler is filled in resin, the flowability of the electrically conducting resin composition is rarely deteriorated, and it is possible to obtain a fuel cell separator with high electrical conductivity and excellent flexural property, when a polypropylene resin with high molecular weight (MFR is low) is used as a binder resin.

The present invention is based on the foregoing findings and provides the following constitutions.

(1) An electrically conducting resin composition for a fuel cell separator comprising a component A including a polypropylene resin whose melt flow rate is 0.01 or higher and 10 or lower and a component B including an electrically conducting filler.

(2) An electrically conducting resin composition for a fuel cell separator according to claim 1, wherein a melt flow rate of the polypropylene resin of the component A is 0.1 or higher and 2 or lower.

(3) An electrically conducting resin composition for a fuel cell separator according to claim 1, wherein the component A content is 2% by mass or higher and 30% by mass or lower, and the component B content is 70% by mass or higher and 98% by mass or lower when the sum of the component A and the component B is assumed to be 100% by mass.

(4) An electrically conducting resin composition for a fuel cell separator according to claim 1 further comprising a component C including an elastomer.

(5) An electrically conducting resin composition for a fuel cell separator according to claim 4, wherein the sum of the component A and the component C accounts for 2% by mass or higher and 30% by mass or lower, and the component B accounts for 70% by mass or higher and 98% by mass or lower when the sum of the component A, the component B, and the component C is assumed to account for 100% by mass.

(6) An electrically conducting resin composition for a fuel cell separator according to claim 4, wherein the elastomer of the component C contains at least one selected from the group consisting of a hydrogenated styrene-butadiene rubber, styrene-ethylene/butylene-styrene block copolymer, styrene-ethylene/propylene-styrene block copolymer, crystalline-block ethylene/butylene-crystalline block copolymer, styrene-ethylene/butylene-crystalline block copolymer, styrene-isoprene-styrene block copolymer, and styrene-butadiene-styrene block copolymer and polyolefin.

(7) An electrically conducting resin composition for a fuel cell separator according to claim 1, wherein the component B contains at least one selected from the group consisting of a metallic material, a carbonaceous material, electrically conducting polymer, a metal-coated filler, and metal oxide.

(8) An electrically conducting resin composition for a fuel cell separator according to claim 1, wherein the component B contains a carbonaceous material containing 0.05% by mass or higher and 5% by mass or lower of boron.

(9) An electrically conducting resin composition for a fuel cell separator according to claim 1, wherein the component B contains 0.1% by mass or higher and 50% by mass or lower of a vapor-grown carbon fiber and/or a carbon nanotube.

(10) An electrically conducting resin composition for a fuel cell separator according to claim 9, wherein the vapor-grown carbon fiber and/or the carbon nanotube contain 0.05% by mass or higher and 5% by mass or lower of boron.

(11) An electrically conducting resin composition for a fuel cell separator according to claim 1, wherein the apparent viscosity in molten state is from $7 \times 10^2$ Pa·s to $1 \times 10^3$ Pa·s.

(12) A fuel cell separator made by molding an electrically conducting resin composition for a fuel cell separator according to any one of claims 1 to 11.

The fuel cell separator of the present invention having the aforementioned constitutions is excellent in electrical conductivity, flexural strength, and flexural strain.

DETAILED DESCRIPTION OF THE INVENTION

The present invention will hereinafter be described in more detail. In the following descriptions, "parts" and "%" indicate ratio by mass unless otherwise stated.

(Electrically Conducting Resin Composition for Fuel Cell Separator)

An electrically conducting resin composition for fuel cell separator (hereinafter may be referred to as electrically conducting resin composition) of the present invention includes a polypropylene resin (component A) whose MFR is 0.01 or higher and 10 or lower and an electrically conducting filler (component B). Also, an electrically conducting resin composition of the present invention may include elastomer (component C) and/or other thermoplastic resin. The component A, the component C, and other thermoplastic resin are collectively referred to as a resin component. The resin component will hereinafter be described in detail.

(Component A: Polypropylene Resin)

The component A is not restricted in terms of other property if being a polypropylene resin whose MFR is 0.01 or higher and 10 or lower. As this polypropylene resin, there can be cited homopolymer typed polypropylene resin such as isotactic polypropylene, atactic polypropylene, or syndiotactic polypropylene and copolymer typed polypropylene resin such as random copolymer or block copolymer. Among these polypropylene resins, homopolymer typed polypropylene is preferable from the view of the molecular structure, and isotactic polypropylene is particularly preferable due to the possibility of obtaining excellent balance of flexural modulus and flexural strain.

Furthermore, polypropylene whose MFR is 0.05 or higher and 5 or lower is more preferable due to the possibility of obtaining excellent flexural property, while polypropylene whose MFR is 0.1 or higher and 2 or lower is much more preferable. Here, MFR of the polypropylene resin of the present invention is measured according to JIS K 7210 M method (a test temperature: 230° C. and a test load: 21.1 N (2.16 kg)).

(Component C: Elastomer)

The electrically conducting resin composition of the present invention may also contain an elastomer component. Elastomer is a polymer that has rubber-like elasticity at around ambient temperature. The elastomer component can contain any one or a combination of two or more selected, for example, from among acrylonitrilebutadiene rubber, hydrogenated nitrile rubber, styrene-butadiene rubber, ethylene-propylene rubber, ethylene-propylene-diene ternary copolymer rubber, ethylene-butadiene rubber, fluorocarbon rubber, isoprene rubber, silicon rubber, acrylic rubber, butadiene rubber, high-styrene rubber, chloroprene rubber, urethane rubber, special polyether rubber, tetrafluoroethylene-propylene rubber, epichlorohydrin rubber, norbornene rubber, butyl rubber, styrene-based thermoplastic elastomer, olefin-based thermoplastic elastomer, urethane-based thermoplastic elastomer, polyester-based thermoplastic elastomer, polyamide-based thermoplastic elastomer, 1,2-polybutadien-based thermoplastic elastomer, fluorinated thermoplastic elastomer, and soft acrylic resin, but is not restricted thereto. Among these elastomers, styrene-based thermoplastic elastomer is preferable due to the possibility of obtaining both of high electrical conductivity and excellent flexural property.

As a styrene-based thermoplastic elastomer which is preferable as the component C, there can be cited, for example, hydrogenated styrene-butadiene rubber, styrene-ethylene/butylene-styrene block copolymer, styrene-ethylene/propylene-styrene block copolymer, crystalline-block ethylene/butylene-crystalline block copolymer, styrene-ethylene/butylene-crystalline block copolymer, styrene-isoprene-styrene block copolymer, and styrene-butadiene-styrene block copolymer. Among these alternatives, hydrogenated styrene-butadiene rubber, styrene-ethylene/butylene-styrene block copolymer, and styrene-ethylene/propylene-styrene block copolymer are preferable due to the possibility of high dispersibility in the polypropylene resin.

It is desirable for the electrically conducting resin composition to include the aforementioned elastomer by replacing a part of the propylene resin of the component A. Specifically, it is preferable to include 0.01% by mass or higher and 50% by mass or lower of the component C by replacing, when the sum of the component A and the component C accounts for 100% by mass. If the elastomer (component C) accounts for 50% by mass or higher, the flexural strength is reduced. In particular, 0.01% by mass or higher and 50% by mass or lower of the component C are more preferable due to the possibility of simultaneously obtaining high flexural strain and flexural strength.

(Other Thermoplastic Resin)

The electrically conducting resin composition of the present invention may include other thermoplastic resins except polypropylene within the scope of not taking away from the effects of the present invention. The thermoplastic resin can contain any one or a combination of two or more selected, for example, among acrylonitrile-butadiene-styrene copolymer, polyvinyl chloride, polyimide, liquid crystalline polymer, polyetheretherketone, fluorocarbon resin such as polyvinylidene fluoride or polyethylene tetrafluoride, polyolefin such as polyethylene or polypropylene, polyacetal, polyamide, polyethylene terephthalate, polybutylene terephthalate, polyphenylene sulfide, polyphenylene oxide, polyphenylene sulfone, polystyrene, acrylic resin, polycarbonate, and polycycloolefin, but is not restricted thereto.

In addition to the foregoing components, any component selected among various additives such as thermosetting resin, monomer, plasticizing agent, curing agent, curing initiator, curing aid, solvent, ultraviolet stabilizer, antioxidant, thermal stabilizer, antifoaming agent, leveling agent, mold-releasing agent, lubricant, water repellent agent, thickener, low shrinkage agent, flame retardant, and hydrophilicizing agent may be added to the resin component as appropriate.

(Method for Manufacturing Component A or Resin Component)

As a method for manufacturing the component A or the mixture of the resin component including the components A and C of the present invention, there can be cited physical methods such as a solution method, emulsion method, and melting method and chemical methods such as graft polymerization method, block polymerization method, and IPN (Interpenetrating Polymer Networks) method, but it is not restricted thereto.

When manufacturing a resin component by blending different kinds of polymers, a melting method is preferable in terms of diversity. Example of a specific procedure for a melting method includes a blending procedure utilizing a kneading machine such as a roller, kneader, Banbury mixer, or extruding machine, but it is not restricted thereto.

(Component B)

In the present invention, the component B that constitutes the electrically conducting resin composition together with the resin component is not subject to any specific restrictions as long as it is an electrically conducting filler. The component B preferably employs any one or a combination of two or more selected from among metallic material, carbonaceous material, conductive polymer, metal-coated filler, and metal oxide in terms of electrical conductivity. At least one of carbonaceous material and metallic material are more preferable. The component B will hereinafter be described in detail.

(Metallic Material)

The metallic material preferably contains any one or a composite material of two or more selected among Ni, Fe, Co, B, Pb, Cr, Cu, Al, Ti, Bi, Sn, W, P, Mo, Ag, Pt, Au, TiC, NbC, TiCN, TiN, CrN, $TiB_2$, $ZrB_2$, $Fe_2B$ in terms of electrical conductivity. These metallic materials can further be used as a powder or a fiber.

(Carbonaceous Material)

The carbonaceous material can contain any one or a combination of two or more selected among carbon black, carbon fiber, amorphous carbon, exfoliated graphite, artificial graphite, natural graphite, vapor-grown carbon fiber, carbon nanotube, and fullerene in terms of electrical conductivity.

It is further preferable that the carbonaceous material contain 0.05% by mass or higher and 5% by mass or lower of boron to increase the electrical conductivity thereof. If the content of boron is lower than 0.05% by mass, it is very likely that no intended highly electrically conducting graphite powder can be obtained. On the contrary, if the content of boron is higher than 5% by mass, it is likely that the degree of contribution of the carbon material to the increase in electrical conductivity is reduced.

The content of boron in the carbonaceous material can be measured by any measuring method without being subject to any specific restrictions. In the present invention, a value is used which is measured by the Inductively Coupled Plasma-emission spectroscopy method (hereinafter abbreviated as "ICP") or Inductively Coupled Plasma-emission Mass Spectroscopy method (hereinafter abbreviated as "ICP-MS"). More specifically, in order to measure the content of boron, sulfuric acid and nitric acid are added to a sample to be resolved through microwave heating (at 230° C.) (digester method), and perchloric acid ($HClO_4$) is further added thereto, and then the resolved sample is diluted by adding water to be put on an ICP spectrometer.

(Method for Adding Boron)

It is possible to add boron to the carbonaceous material using a method in which a boron source such as an elemental substance of B, $B_4C$, BN, $B_2O_3$, or $H_3BO_3$ is added to any one or a mixture of two or more of natural graphite, artificial graphite, exfoliated graphite, carbon black, carbon fiber, vapor-grown carbon fiber, and carbon nanotube, etc., and then mixed sufficiently to be graphitized at about 2300 to 3200° C. If the boron compound has not been mixed homogeneously, not only does the graphite powder becomes heterogeneous, but also it is likely that the powder may be sintered in the graphitization process. In order to mix the boron compound homogeneously, the foregoing boron sources preferably have a grain diameter of about 50 μm or lower, and more preferably about 20 μm or lower, and are mixed together with powder such as coke.

If no boron is added, it is likely that the degree of graphitization (degree of crystallization) is reduced, the grid interval increased, and it will become more difficult to obtain highly a electrically conducting graphite powder. Also, as a more preferable mode of boron incorporation, there can be cited a mode where boron exists between layers of the graphite crystal and a mode where some carbon atoms that partially form the graphite crystal are replaced with boron atoms, but there is no restriction thereto as long as boron and/or a boron compound are mixed in the graphite. The bonding between boron atoms and carbon atoms when some carbon atoms are replaced with boron atoms can employ any bonding manner such as covalent bonding or ion bonding.

(Carbon Black)

As carbon black as an example of the aforementioned carbonaceous material, for example, there can be cited Ketjen black generated by imperfect combustion of natural gas, etc., or thermal decomposition of acetylene, acetylene black, furnace carbon generated by imperfect combustion of hydrocarbon oil or natural gas, and thermal carbon generated by thermal decomposition of natural gas.

(Carbon Fiber)

As aforementioned carbon fiber, there can be cited pitch-based carbon fibers made of heavy oil, by-product oil, and/or coal tar, etc., and PAN-based carbon fibers made of polyacrylonitrile.

(Amorphous Carbon)

In order to obtain amorphous carbon, there can be cited, for example, a method in which phenol resin is hardened, baked, and crushed into powder and a method in which phenol resin is hardened while in a spherical or irregular powder state and baked. It is preferable to perform heat treatment at 2000° C. or higher to obtain highly electrically conducting amorphous carbon.

(Exfoliated Graphite)

The aforementioned exfoliated graphite powder can employ, for example, powder obtained by immersing highly crystallized graphite such as natural graphite or thermally decomposed graphite into a strongly acidic solution such as a mixture of concentrated sulfuric acid and nitric acid or a mixture of concentrated sulfuric acid and hydrogen peroxide solution to generate a graphite intercalation compound, and then washing and heating the compound rapidly to expand the graphite crystal in the C-axis direction, or powder obtained by rolling thus obtained powder into a sheet-like structure to be crushed again.

(Artificial Graphite)

In order to obtain artificial graphite, coke is first manufactured in general. Coke is obtained by carbonizing petroleum pitch or coal pitch, etc. In order to obtain a graphite powder from coke, there can generally be cited, for example, a method in which crushed coke is graphitized, a method in which graphitized coke is crushed, and a method in which coke with a binder added thereto is molded and baked, and the baked products (coke and baked products are collectively referred to as cokes) are graphitized and then crushed into powder. Since it is advantageous for the coke to be as little crystallized as possible, it is preferable to perform heat treatment at 2000° C. or lower, and more preferably 1200° C. or lower.

The graphitization method can employ a method that utilizes an Acheson furnace in which powder is set in a graphite crucible to be energized directly or a method in which powder is heated by means of a graphite exothermic body.

In order to crush coke, artificial graphite, and natural graphite, etc., it is possible to use any of the various high-speed rotary pulverizers (hammer mill, pin mill, cage mill), various ball mills (tumbling mill, vibrating mill, epicyclic mill), and various stirring mills (beads mill, attritor, flow tube type mill, annular mill). It is also possible to use a fine pulverizer such as a screen mill, turbo mill, super-micron mill, or jet mill by selecting a condition. Coke and natural graphite, etc., are crushed using any of these pulverizers, while selecting a crushing condition, classifying powder as appropriate, and controlling the average grain diameter and grain size distribution.

Any method can be used to classify coke powder, artificial graphite powder, and natural graphite powder, etc., as long as the method can make a classification. It is possible to use, for example, a screening method or a method that utilizes an airflow classifier such as a forced vortex type centrifugal classifier (Micron separator, Turboplex classifier, Turbo classifier, Super separator) or an inertial classifier (Improved Virtual Impactor, Elbow-Jet classifier). It is also possible to use a wet sedimentation separation method or a centrifugal classification method.

(Vapor-Grown Carbon Fiber, Carbon Nanotube)

The component B of the present invention preferably contains 0.1% by mass or higher and 50% by mass or lower of at least one of vapor-grown carbon fiber and carbon nanotube, more preferably 0.1% by mass or higher and 45% by mass or lower, and further preferably 0.2% by mass or higher and 45% by mass or lower. If these contents in the component B account for lower than 0.1% by mass, there is no contribution to the increase in electrical conductivity, while if these contents account for higher than 50% by mass, it is likely that moldability is reduced.

In addition, the vapor-grown carbon fiber or carbon nanotube preferably contains 0.05% by mass or higher and 5% by mass or lower of boron, more preferably 0.06% by mass or higher and 4% by mass or lower, and further preferably 0.06% by mass or higher and 3% by mass or lower. If the content of boron accounts for lower than 0.05% by mass, there is little contribution in adding boron to the increase in electrical conductivity, while if the content of boron accounts for higher than 5% by mass, it is likely that other physical properties are reduced due to the increase in the amount of impurities.

Vapor-grown carbon fibers can be obtained by thermally decomposing an organic compound material such as benzene, toluene, or natural gas together with hydrogen gas at 800 to 1300° C. under the existence of a transition metal catalyst such as ferrocene, the fiber diameter of which is about 0.5 to 10 μm. Further, it is preferable to subsequently perform graphitization treatment at about 2300 to 3200° C., and more preferably with a graphitization catalyst such as boron, boron carbide, beryllium, aluminum, or silicon.

Carbon nanotubes have received industrial attention recently due to not only their mechanical strength but also field emission features and hydrogen absorption features, and further increasingly their magnetic features. This kind of carbon nanotube is also referred to as graphite whisker, filamentous carbon, graphite fiber, superfine carbon tube, carbon tube, carbon fibril carbon microtube, or carbon nanofiber, the fiber diameter of which is about 0.5 to 100 nm. Carbon nanotubes can be classified into two categories: single-walled carbon nanotubes composed of a single layer of graphite film and multi-walled carbon nanotubes composed of multiple layers of graphite films. Although the present invention can employ a single-walled or a multi-walled carbon nanotube, it is preferable to employ a single-walled carbon nanotube whereby it is likely that a composition having a higher electrical conductivity and mechanical strength is obtained.

Carbon nanotubes can be produced by, for example, an arc discharge method, laser evaporation method, or thermal decomposition method described in Saito and Bando, "Fundamentals of Carbon Nanotubes" (pp. 23-57, published by Corona Publishing Co., Ltd. in 1998), and then further purified by, for example, a hydrothermal method, centrifugal separation method, ultrafiltration method, or oxidation method. It is more preferable to perform heat treatment in an inert gas atmosphere of about 2300 to 3200° C. to eliminate impurities, and further preferably with a graphitization catalyst such as boron, boron carbide, beryllium, aluminum, or silicon.

(Composition)

In the present invention, it is preferable that the resin component accounts for 2% by mass or higher and 30% by mass or lower, while the component B accounts for 70% by mass or higher and 98% by mass or lower in the total mass (100% by mass) of the resin component and the component B as the composition ratio therebetween. More preferably, the resin component accounts for 5% by mass or higher and 20% by mass or lower, while the component B accounts for 80% by mass or higher and 95% by mass or lower, and further preferably the polymer component accounts for 5% by mass or higher and to 15% by mass or lower, while the component B accounts for 85% by mass or higher and to 95% by mass or lower. If the resin component accounts for lower than 2% by mass, it is likely that moldability is reduced. On the contrary, if the resin component accounts for higher than 30% by mass, it is more likely that the volume resistivity results in 1 Ω·cm or higher.

As the composition ratio between the components A and B, it is preferable that the component A accounts for 2% by mass or higher and 30% by mass or lower, while the component B accounts for 70% by mass or higher and 98% by mass or lower in the total mass (100% by mass) of the components A and B. More preferably, the component A accounts for 5% by mass or higher and 20% by mass or lower, while the component B accounts for 80% by mass or higher and 95% by mass or lower, and further preferably the polymer component accounts for 5% by mass or higher and to 15% by mass or lower, while the component B accounts for 85% by mass or higher and to 95% by mass or lower. If the component A accounts for lower than 2% by mass, it is likely that moldability is reduced. On the contrary, if the component A accounts for higher than 30% by mass, it is more likely that the volume resistivity results in 1 Ω·cm or higher.

(Additives)

In order to improve the hardness, strength, electrical conductivity, moldability, durability, weather resistance, and water resistance of the electrically conducting resin composition of the present invention, it is further possible, as appropriate, to add additives such as glass fiber, whisker, metal oxide, organic fiber, ultraviolet stabilizer, antioxidant, mold-releasing agent, lubricant, water repellent agent, thickener, low shrinkage agent, and hydrophilicizing agent.

(Viscosity)

In the electrically conducting resin composition of the present invention, it is preferable that the apparent viscosity in molten state is from $7 \times 10^2$ Pa·s to $1 \times 10^3$ Pa·s. When the apparent viscosity in molten state falls within the above range, the moldability become favorable.

The apparent viscosity in molten state can be measured by any known measuring method without being subject to any specific restrictions. There can be cited, for example, a method for measuring a viscosity by using a capillograph produced by Toyo Seiki Co., Ltd with the capillary of 1 mm in diameter and 10 mm in length at 280° C. and 1,000 (seconds)$^{-1}$ in shear rate.

(Manufacturing Method)

Although the method for manufacturing the electrically conducting resin composition of the present invention is not subject to any specific restrictions, it is preferable to mix the foregoing components as uniformly as possible using a mixing machine or a kneading machine that is generally used in resin applications, such as a roll, extruding machine, kneader, Banbury mixer (trademark), Henschel mixer (trademark), or planetary mixer.

There can also be cited, for example, a method in which a preliminarily manufactured the resin component is mixed with the component B and a method in which each resin component is kneaded under the existence of the component B, but there is no restriction thereto.

In order to facilitate material supply to a molding machine and a mold, the electrically conducting resin composition of the present invention may be crushed or granulated as appropriate after the kneading or mixing process. For the crushing operation, it is possible to use a homogenizer, Wiley mill, or high-speed rotary pulverizer (hammer mill, pin mill, cage mill, blender), etc., and it is preferable to cool the material during the crushing operation to prevent mutual coagulation of materials. For the granulation operation, it is possible to use an extruding machine, extruder, or co-kneader, etc., for pelletization or to use a rotary pan type granulator, etc.

(Fuel Cell Separator)

The method for manufacturing a fuel cell separator using the electrically conducting resin composition of the present invention is not subject to any specific restrictions. As a specific example of the manufacturing method, a compression molding method, transfer molding method, injection molding method, or cast molding method can be cited, along with an injection-compression molding method, but it is not restricted thereto. It is more preferable to vacuum the inside of or the entire mold in the molding process.

In order to increase the molding cycle rate in a compression molding process, it is preferable to use a multi-cavity mold. It is further preferable to use a multistage press (stacking press) method whereby many products can be molded with a small output. In order to improve the profile accuracy of a planar product, it is preferable to mold a sheet once followed by compression molding process.

In order to further improve the moldability in an injection molding process, carbon dioxide may be supplied through the intermediate part of the cylinder of the molding machine to be dissolved into the material, so that the material is molded in a supercritical state. In order to improve the profile accuracy of products, it is preferable to use an injection-compression molding method. As an injection-compression molding method, there can be cited, for example, a method in which the material is injected with the mold opened, a method in which the material is injected while closing the mold, and a method in which the mold clamping force against the closed mold is once released, and then applied again after the material is injected.

(Mold)

The mold to be used in the molding process of the present invention is not subject to any specific restrictions as long as the temperature thereof can be controlled as mentioned above. For example, in the case of a material having a high hardening rate and low flowability, it is preferable to use an adiabatic mold with an adiabatic layer provided in the cavity. A mold introducing a temperature profiling system capable of increasing and decreasing the mold temperature during a molding process is further preferable. As a temperature profiling system, there can be cited, for example, a system in which inductive heating and a cooling medium (e.g. air, water, or oil) are switched and a system in which a heating medium (e.g. hot water or heating oil) and a cooling medium are switched, but it is not restricted thereto.

It is important to select and search for the optimum mold temperature in accordance with the type of the composition. For example, the optimum value can be decided within a temperature range between 90 and 200° C. and a time range between 10 and 1200 seconds. The method for necessarily cooling a molded product that is taken out at a high temperature is not subject to any specific restrictions. For example, in order to prevent warpage, there can be cited, for example, a method in which the molded product is cooled in a sandwiched manner between cooling plates and a method in which the molded product is cooled together with the mold.

It is possible to obtain the fuel cell separator according to the present invention, on both sides or one side of which is formed a gas flow path, by molding the electrically conducting resin composition of the present invention in accordance with the foregoing molding method. The gas flow path (e.g. groove) may be formed by machining the molded body of the electrically conducting resin composition. The gas flow path may also be formed by compression molding or stamping molding, etc., using a mold having the inverted shape of the gas flow path.

Figure 1:
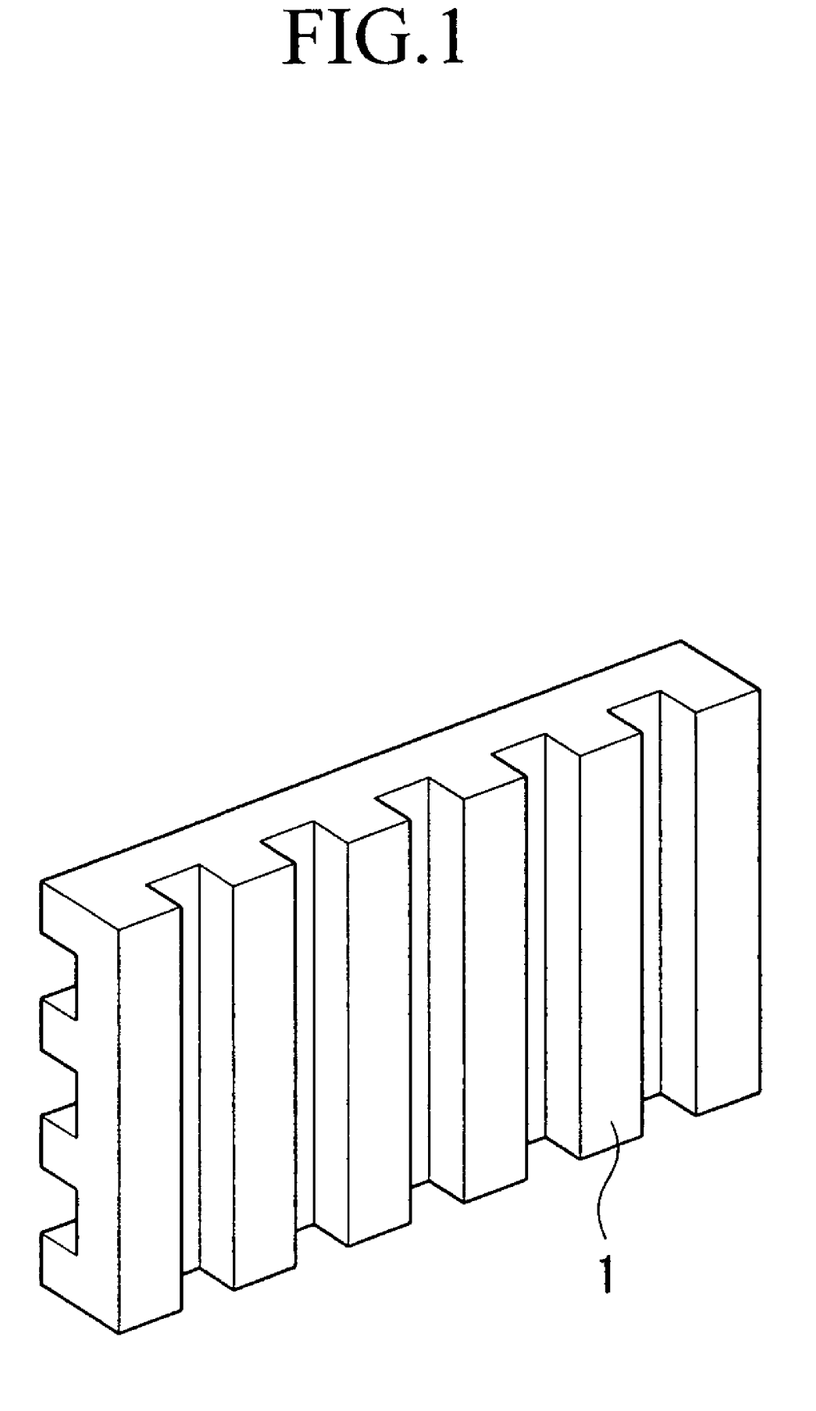
FIG. 1 is a perspective view illustrating a fuel cell separator of the present invention, in which the numeral 1 indicates a fuel cell separator.

The cross-sectional shape and the shape of the flow path in the fuel cell separator of the present invention are not subject to any specific restrictions. For example, the cross-section of the flow path may have a rectangular, trapezoidal, triangular, or semicircular shape. The flow path may have, for example, a straight or meandering shape. The width of the flow path is preferably 0.1 to 2 mm, and the depth 0.1 to 1.5 mm. An example of the fuel cell separator is illustrated in FIG. 1.

The thickness of the thinnest part in the fuel cell separator of the present invention is preferably 1 mm or less, and more preferably 0.8 mm. If the thickness is more than 1 mm, the thickness of the separator is increased, resulting in an undesired increase in voltage drop in the separator due to the resistance thereof.

The fuel cell separator of the present invention is preferably formed with a through hole that serves as a manifold through which gas and water flow. As a method for forming a through hole, there can be cited, for example, a method in which a through hole is formed during the molding process and a method in which a through hole is formed by a cutting operation after the molding process, but it is not restricted thereto.

(Applications of Fuel Cell Separator)

Since the fuel cell separator of the present invention has high electrical conductivity, flexural strength, and flexural strain, it is the best as a fuel cell separator.

EXAMPLES

Examples of the present invention will hereinafter be described in further detail, but it is not restricted thereto.

The materials used in the examples will be described hereinafter.

(Resin Component)

Resins 1 to 10, shown in Table 1, containing the components A and B were prepared as the resin component.

As the polypropylene resin of the component A, there were used SunAllomer PX900N (MFR=30), PX600N (MFR=7), PX400A (MFR=2), PW201N (MFR=0.4) manufactured by SunAllomer, Ltd.

The value of MFR is measured by the method in conformity with JIS K7210, specifically at a test temperature of 230° C. and a test load of 21.18 N (2.16 kg).

As the elastomer of the component C, there were used hydrogenated styrene-butadiene rubber (H-SBR) of Dynalon 1320P manufactured by JSR Corp. and styrene-ethylene/butylene-styrene block copolymer (SEBS) of Kraton G1652 manufactured by Kraton Polymers Japan, Ltd.

TABLE 1

| | Component | (% by mass) | | | | | | | | | |
|---|---|---|---|---|---|---|---|---|---|---|---|
| | | Resin 1 | Resin 2 | Resin 3 | Resin 4 | Resin 5 | Resin 6 | Resin 7 | Resin 8 | Resin 9 | Resin 10 |
| Component A | Polypropylene (MFR = 0.4) | 100 | — | — | — | 95 | — | — | — | 95 | — |
| | Polypropylene (MFR = 2) | — | 100 | — | — | — | 95 | — | — | — | — |
| | Polypropylene (MFR = 7) | — | — | 100 | — | — | — | 95 | — | — | — |
| | Polypropylene (MFR = 30) | — | — | — | 100 | — | — | — | 95 | — | 95 |
| Component C | SEBS | — | — | — | — | 5 | 5 | 5 | 5 | — | — |
| | H-SBR | — | — | — | — | — | — | — | — | 5 | 5 |

(Component B: Electrical Conducting Filler) (B1: Boron-containing Fine Graphite Powder)

MC coke manufactured by MC Carbon Co., Ltd., as non-needle coke was crushed coarsely into grains of 2 to 3 mm or less in size using a pulverizer (manufactured by Hosokawa-micron Corp.). These coarse grains were crushed finely using a jet mill (IDS2UR manufactured by Nippon Pneumatic Mfg. Co., Ltd.), and then classified into desired grain diameters. Grains of 5 μm or less in size were removed by airflow classification using a Turbo classifier (TC15N manufactured by Nisshin Engineering Inc.). 0.6 kg of boron carbide ($B_4C$) was added to part (14.4 kg) of the thus classified fine grains, and then mixed using a Henschel mixer (trademark) at 800 rpm for 5 minutes. The mixture was encapsulated in a graphite crucible having an inside diameter of 40 cm and a volume of 40 L with a cover, and then placed in a graphitization furnace utilizing a graphite heater to be graphitized in argon gas atmosphere at a temperature of 2900° C. The powder was taken out of the crucible after being left and cooled to find that the production amount was 14 kg. The obtained fine graphite powder had an average grain diameter of 20.5 μm and a B content of 1.9% by mass. In this way, the boron-containing fine graphite powder was obtained.

(B2: Mixture of Vapor-Grown Carbon Fiber and Boron-containing Fine Graphite Powder)

5% by mass of VGCF-G (trademark) manufactured by Showa Denko K.K. as a Vapor-Grown Carbon Fiber and 95% by mass of the boron-containing fine graphite powder (B1) were mixed in a Henschel mixer (trademark). The obtained carbonaceous mixture had an average grain diameter of 12.4 μm and a B content of 1.3% by mass. The aforementioned "VGCF-G" had a fiber diameter of 0.1 to 0.3 μm and a fiber length of 10 to 50 m.

(B3: Mixture of Carbon Nanotube (hereinafter abbreviated as "CNT") and B1 (Fine Graphite Powder))

95% by mass of the component B1 and 5% by mass of a CNT were mixed in a Henschel mixer (trademark). The obtained carbonaceous mixture had an average grain diameter of 9.2 μm and a B content of 1.2% by mass. In this way, the mixture B3 was obtained.

Carbon nanotubes were obtained as follows.

A hole of 3 mm in diameter and 30 mm in depth was formed from the leading edge of a graphite bar of 6 mm in diameter and 50 mm in length along the central axis thereof, and rhodium (Rh), platinum (Pt) and graphite (C) were stuffed into the hole at a mass ratio of 1:1:1 as mixed powder to produce an anode. Meanwhile, a cathode of 13 mm in diameter and 30 mm in length made of graphite having a purity of 99.98% by mass was produced. These electrodes were arranged in a reaction chamber facing each other to be connected to a direct-current power source. Then, the air inside the reaction chamber was replaced with helium gas having a purity of 99.9% by volume to perform direct-current arc discharge. Subsequently, soot (chamber soot) attached to the inner wall of the reaction chamber and soot (cathode soot) deposited on the cathode were collected. The pressure in the reaction chamber and the current were 600 Torr and 70 A, and the anode and cathode were operated in such a manner as to have a constant gap of 1 to 2 mm therebetween during the reaction.

The collected soot was placed in a mixed solvent containing water and ethanol at a mass ratio of 1:1 to be dispersed ultrasonically, and then the dispersion liquid was collected to eliminate the solvent using a rotary evaporator. Then, after the sample was dispersed ultrasonically in a 0.1% aqueous solution of benzalkonium chloride as a cationic surface-active agent, the sample was centrifugally separated at 5000 rpm for 30 minutes, and then the dispersion liquid was collected. Further, the dispersion liquid was heat-treated and thereby purified in the air at 350° C. for 5 hours to obtain carbon nanotubes having a fiber diameter of 1 to 10 nm and a fiber length of 0.05 to 5 μm.

Examples 1 to 9, Comparative Examples 1 to 3

The primary materials according to the resin component and the component B shown in Table 1 were placed in a Laboplastmill (trademark) (model 50C150 manufactured by Toyo Seiki Seisaku-Sho, Ltd.) and kneaded at a temperature of 200° C. and a rotation rate of 45 rpm for 7 minutes to obtain an electrically conducting resin composition. This composition was placed in a mold capable of molding a flat plate of 100 mm×100 mm (the thickness varies for each physical property test item), and then pressurized and heated using a 50 t compression molding machine (E-3013 manufactured by Nippon Engineering Co., Ltd.) at a temperature of 230° C. and a pressure of 15 MPa for 3 minutes after 3-minute pre-heating. Subsequently, the mold was cooled using a cooling press at a temperature of 25° C. and a pressure of 15 MPa for 2 minutes to obtain molded bodies of examples 1 to 9 and comparative examples 1 to 3. The composition of each molded body is shown in Tables 2 and 3.

Also, the results of measuring the flexural strength, the flexural modulus, the flexural strain, and the volume resistivity of each molded body are shown in Tables 2 and 3.

The volume resistivity was measured by a four-pin probe method in conformity with JIS K7194.

Also, the flexural strength, the flexural modulus, and the flexural strain were measured by using an autograph (AG-10kNI) manufactured by Shimadzu Corp. Specifically, a test piece (80 mm×10 mm×4 mm) was measured at a span interval of 64 mm and a flexural rate of 1 mm/min by a flexural strength measuring method under 3 point loading condition in conformity with JIS K6911.

The apparent viscosity in molten state was measured by using a capillograph produced by Toyo Seiki Co., Ltd with the capillary of 1 mm in diameter and 10 mm in length at 280° C. and 1,000 $(seconds)^{-1}$ in shear rate.

TABLE 2

|  |  | Example 1 | Example 2 | Example 3 | Example 4 | Example 5 | Comparative example 1 |
|---|---|---|---|---|---|---|---|
| Resin composition | Resin 1 | 15 | — | — | 15 | 15 | — |
|  | Resin 2 | — | 15 | — | — | — | — |
|  | Resin 3 | — | — | 15 | — | — | — |
|  | Resin 4 | — | — | — | — | — | 15 |
| Component B | B1 | 85 | 85 | 85 | — | — | 85 |
|  | B2 | — | — | — | 85 | — | — |
|  | B3 | — | — | — | — | 85 | — |
| Volume resistivity (mΩ · cm) | | 5.4 | 5.0 | 4.7 | 5.1 | 5.0 | 3.7 |
| Flexural strength (MPa) | | 49.6 | 49.3 | 49.0 | 50.8 | 51.1 | 48.9 |
| Flexural modulus (GPa) | | 8.8 | 8.6 | 8.6 | 9.0 | 9.1 | 8.3 |
| Flexural strain (%) | | 1.03 | 1.01 | 1.01 | 1.21 | 1.25 | 0.91 |
| Apparent viscosity (Pa · s) | | $8.1 \times 10^2$ | $7.4 \times 10^2$ | $7.0 \times 10^2$ | $8.3 \times 10^2$ | $8.3 \times 10^2$ | $6.8 \times 10^2$ |

The composition of the resin component and the component B is described by mass ratio.

The composition of the resin component and the component B is described by mass ratio.

TABLE 3

|  |  | Example 6 | Example 7 | Example 8 | Example 9 | Comparative example 2 | Comparative example 3 |
|---|---|---|---|---|---|---|---|
| Resin composition | Resin 5 | 15 | — | — | — | — | — |
|  | Resin 6 | — | 15 | — | — | — | — |
|  | Resin 7 | — | — | 15 | — | — | — |
|  | Resin 8 | — | — | — | — | 15 | — |
|  | Resin 9 | — | — | — | 15 | — | — |
|  | Resin 10 | — | — | — | — | — | 15 |
| Component B | B1 | 85 | 85 | 85 | 85 | 85 | 85 |
| Volume resistivity (mΩ · cm) | | 6.0 | 5.9 | 5.5 | 6.2 | 4.4 | 4.4 |
| Flexural strength (MPa) | | 48.2 | 46.3 | 43.5 | 47.5 | 36.5 | 36.2 |
| Flexural modulus (GPa) | | 7.5 | 6.4 | 6.1 | 7.3 | 5.6 | 5.6 |
| Flexural strain (%) | | 2.24 | 2.32 | 2.25 | 2.15 | 1.83 | 1.79 |

As shown in the aforementioned Tables 2 and 3, the molded bodies of the examples 1 to 9, in which the polypropylene was used, were found to be excellent in electrical conductivity, flexural strength, and flexural strain.

Example 10

The aforementioned composition of the example 6 was placed in a mold capable of molding a flat plate of 100 mm×200 mm×1.5 mm in size with six through holes and a groove of 1 mm in width pitch and 0.5 mm in depth formed on either side thereof, and then pressurized and heated using the 50 t compression molding machine at a temperature of 230° C. and a pressure of 15 MPa for 3 minutes after 3-minute preheating. Subsequently, the mold was cooled using a cooling press at a temperature of 25° C. and a pressure of 15 MPa for 2 minutes to obtain a fuel cell separator. This fuel cell separator had a volume resistivity of 6.5 mΩ·cm and a thickness in the middle of 1.51 mm, and was very favorable.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An electrically conducting resin composition for a fuel cell separator consisting essentially of:
   component (A) a polypropylene resin whose melt flow rate is from 0.01 to 10 as a component A;
   component (B) an electrically conducting filler consisting essentially of a carbonaceous material containing boron; and
   component (C) an additive.

2. An electrically conducting resin composition for a fuel cell separator according to claim 1, wherein a melt flow rate of the polypropylene resin of the component A is from 0.1 to 2.

3. An electrically conducting resin composition for a fuel cell separator according to claim 1, wherein the component A is present in an amount from 2% by mass to 30% by mass, and the component B is present in an amount from 70% by mass to 98% by mass when the sum of the component A and the component B is 100% by mass.

4. An electrically conducting resin composition for a fuel cell separator according to claim 1, wherein the component B further contains at least one selected from the group consisting of a metallic material, an electrically conducting polymer, a metal-coated filler, and metal oxide.

5. An electrically conducting resin composition for a fuel cell separator according to claim 1, wherein the component B contains a carbonaceous material containing 0.05% by mass to 5% by mass of boron.

6. An electrically conducting resin composition for a fuel cell separator according to claim 1, wherein the component B contains 0.1% by mass to 50% by mass of a vapor-grown carbon fiber and/or a carbon nanotube.

7. An electrically conducting resin composition for a fuel cell separator according to claim 6, wherein the vapor-grown carbon fiber and/or the carbon nanotube contain 0.05% by mass to 5% by mass of boron.

8. An electrically conducting resin composition for a fuel cell separator according to claim 1, wherein the apparent viscosity in molten state is from $7\times10^2$ Pa·s to $1\times10^3$ Pa·s.

9. A fuel cell separator made by molding an electrically conducting resin composition for a fuel cell separator according to any one of claims 1-3 or 4-8.

10. An electrically conducting resin composition for a fuel cell separator consisting essentially of:
component (A) a polypropylene resin whose melt flow rate is from 0.01 to 10 as a component A;
component (B) an electrically conducting filler, which is present in an amount of 80% to 95% by mass; and
component (C) an additive.

11. An electrically conducting resin composition for a fuel cell separator according to claim 10, wherein the component B contains at least one selected from the group consisting of a metallic material, a carbonaceous material, electrically conducting polymer, and a metal coated filler, and metal oxide.

12. An electrically conducting resin composition for a fuel cell separator according to claim 10, wherein the component B contains a carbonaceous material containing from 0.05% by mass to 5% by mass of boron.

13. An electrically conducting resin composition for a fuel cell separator according to claim 10, wherein the component B contains from 0.1% by mass to 50% by mass of vapor-grown carbon fiber and/or a carbon nanotube.

14. An electrically conducting resin composition for a fuel cell separator according to claim 13, wherein the vapor-grown carbon fiber and/or the carbon nanotube contain from 0.05% by mass to 5% by mass of boron.

15. An electrically conducting resin composition for a fuel cell separator according to claim 10, wherein the apparent viscosity in the molten state is from $7\times10^2$ Pa·s to $1\times10^3$ Pa·s.

16. A fuel cell separator made by molding an electrically conducting resin composition for a fuel cell separator according to any one of claims 10 or 11-15.

17. An electrically conducting resin composition for a fuel cell separator comprising:
a component A including a polypropylene resin whose melt flow rate is from 0.01 to 10;
a component B, including an electrically conducting filler comprising a carbonaceous material containing boron; and
a component C including an elastomer.

18. The electrically conducting resin composition for a fuel cell separator according to claim 17, wherein a melt flow rate of the polypropylene resin of the component A is from 0.1 to 2.

19. The electrically conducting resin composition for a fuel cell separator according to claim 17, wherein the sum of the amount of the component A and the component C is from 5% by mass to 20% by mass, and the component B is present an amount from 80% by mass to 95% by mass when the sum of the component A, the component B, and the component C is 100% by mass.

20. The electrically conducting resin composition for a fuel cell separator according to claim 17, wherein the elastomer of the component C contains at least one selected from the group consisting of a hydrogenated styrene-butadiene rubber, styrene-ethylene/butylene-styrene block copolymer, styrene-ethylene/propylene-styrene block copolymer, crystalline-block ethylene/butylene-crystal line copolymers, styrene-ethylene/butylene-crystalline copolymer, styrene-isoprene-styrene block copolymer, and styrene-butadiene-styrene block copolymer and polyolefin.

21. The electrically conducting resin composition for a fuel cell separator according to claim 17, wherein the component B contains at least one selected from the group consisting of a metallic material, a carbonaceous material, electrically conducting polymer, and a metal coated filler, and metal oxide.

22. The electrically conducting resin composition for a fuel cell separator according to claim 17, wherein the component B contains a carbonaceous material containing from 0.05% by mass to 5% by mass of boron.

23. The electrically conducting resin composition for a fuel cell separator according to claim 17, wherein the component B contains from 0.1% by mass to 50% by mass of vapor-grown carbon fiber and/or a carbon nanotube.

24. The electrically conducting resin composition for a fuel cell separator according to claim 23, wherein the vapor-grown carbon fiber and/or the carbon nanotube contain from 0.05% by mass to 5% by mass of boron.

25. The electrically conducting resin composition for a fuel cell separator according to claim 17, wherein the apparent viscosity in the molten state is from $7\times10^2$ Pa·s to $1\times10^3$ Pa·s.

26. A fuel cell separator made by molding an electrically conducting resin composition for a fuel cell separator according to any one of claims 17 to 25.

27. An electrically conducting resin composition for a fuel cell separator according to claim 17, consisting essentially of the component A, the component B and the component C.

28. The electrically conducting resin composition according to claim 1, wherein the additive is at least one selected from the group consisting of a glass fiber, whisker, metal oxide, organic fiber, ultraviolet stabilizer, antioxidant, mold-releasing agent, lubricant, water repellant agent, thickener, low shrinkage agent, and hydrophilicizing agent.

29. The electrically conducting resin composition according to claim 10, wherein the additive is at least one selected from the group consisting of a glass fiber, whisker, metal oxide, organic fiber, ultraviolet stabilizer, antioxidant, mold-releasing agent, lubricant, water repellant agent, thickener, low shrinkage agent, and hydrophilicizing agent.

* * * * *